US00RE49919E

(19) United States
(12) Reissued Patent
Lee et al.

(10) Patent Number: US RE49,919 E
(45) Date of Reissued Patent: *Apr. 16, 2024

(54) ICE MAKER

(71) Applicant: LG Electronics Inc., Seoul (KR)

(72) Inventors: Donghoon Lee, Seoul (KR); Wookyong Lee, Seoul (KR)

(73) Assignee: LG Electronics Inc., Seoul (KR)

( * ) Notice: This patent is subject to a terminal disclaimer.

(21) Appl. No.: 17/587,880

(22) Filed: Jan. 28, 2022

Related U.S. Patent Documents

Reissue of:
(64) Patent No.: 9,581,372
Issued: Feb. 28, 2017
Appl. No.: 14/011,811
Filed: Aug. 28, 2013

U.S. Applications:
(63) Continuation of application No. 16/288,594, filed on Feb. 28, 2019, now Pat. No. Re. 49,341, which is an application for the reissue of Pat. No. 9,581,372.

(30) Foreign Application Priority Data

Jan. 2, 2013 (KR) ..... 10-2013-0000082

(51) Int. Cl.
*F25C 5/08* (2006.01)
*F25C 1/04* (2018.01)

(52) U.S. Cl.
CPC ..... *F25C 5/08* (2013.01); *F25C 1/04* (2013.01); *F25C 2305/022* (2013.01); *F25C 2305/0221* (2021.08)

(58) Field of Classification Search
CPC ..... F25C 1/04; F25C 5/08; F25C 2305/0221; F25C 2305/022
See application file for complete search history.

(56) References Cited

U.S. PATENT DOCUMENTS 2,083,081 A * 6/1937 Moll ..... A23G 9/083 249/134
2,381,068 A * 8/1945 Lutes ..... F25C 1/24 249/118

(Continued)

FOREIGN PATENT DOCUMENTS

CN 1719165 A * 1/2006
JP 1998-158070 A * 10/1989

(Continued)

OTHER PUBLICATIONS

Korean Notice of Allowance in Korean Application No. 10-2013-0000082, dated Mar. 30, 2020, 3 pages (with English translation).

(Continued)

*Primary Examiner* — William C Doerrler
(74) *Attorney, Agent, or Firm* — Fish & Richardson P.C.

(57) ABSTRACT

An ice maker includes an upper tray that includes a plurality of upper cells that each have a hemispherical shape and an ice making tube disposed at outer circumferential surfaces of the upper cells and configured to cool each of the upper cells. The ice maker also includes a lower tray that includes a plurality of lower cells that each have a hemispherical shape. The lower tray is rotatably connected to the upper tray. The ice maker further includes a rotation shaft connected to a rear end of the lower tray and a rear end of the upper tray, and configured to rotate the lower tray with respect to the upper tray.

15 Claims, 7 Drawing Sheets

(56) References Cited

U.S. PATENT DOCUMENTS 2,407,058 A * 9/1946 Clum ..... F25C 1/04 62/157
2,526,262 A * 10/1950 Munshower ..... F25C 1/10 62/157
2,757,519 A * 8/1956 Sampson ..... F25C 1/04 62/353
2,778,198 A * 1/1957 Heath ..... F25C 1/04 62/137
2,846,855 A * 8/1958 Frei ..... F25C 1/04 62/301
2,857,748 A * 10/1958 Nelson ..... F25C 1/04 62/135
2,912,836 A * 11/1959 Harle ..... F25C 1/04 249/68
2,941,377 A * 6/1960 Nelson ..... F25C 1/04 219/200
2,949,020 A * 8/1960 Erickson ..... F25C 1/24 249/71
3,004,405 A * 10/1961 Upchurch ..... F25C 1/04 62/353
3,029,609 A 4/1962 Zearfoss
3,059,445 A * 10/1962 Kniffin ..... F25C 1/04 62/347
3,188,827 A * 6/1965 Bauerlein ..... F25C 1/04 62/137
3,208,233 A * 9/1965 Linstromberg ..... F25B 49/02 62/137
3,226,944 A 1/1966 Connors
3,273,353 A 9/1966 Horvay et al.
3,383,876 A * 5/1968 Frohbieter ..... F25C 1/04 62/137
3,418,823 A * 12/1968 Salimbeni Vivai ..... F25C 1/08 62/138
3,580,007 A * 5/1971 Bauerlein ..... F25C 1/10 62/345
3,775,992 A * 12/1973 Bright ..... F25C 1/24 62/351
3,892,105 A * 7/1975 Bernard ..... F25C 5/06 62/353
3,941,378 A * 3/1976 Bagley ..... A63D 15/04 312/300
3,952,539 A * 4/1976 Hanson ..... F25C 1/04 62/351
4,366,679 A * 1/1983 Van Steenburgh, Jr. ..... F25C 1/12 62/352
4,417,716 A * 11/1983 Penna ..... F25C 1/243 249/121
4,628,698 A * 12/1986 Needham ..... F25C 1/04 62/137
4,719,762 A * 1/1988 Osabe ..... F25C 5/187 200/61.2
4,852,359 A * 8/1989 Manzotti ..... F25C 1/10 62/353
4,909,039 A * 3/1990 Yamada ..... F25C 1/04 340/622
4,910,974 A * 3/1990 Hara ..... F25C 1/045 62/352
4,942,742 A * 7/1990 Burruel ..... F25C 1/04 249/119
4,970,877 A * 11/1990 Dimijian ..... F25C 1/045 62/344
6,658,869 B1 * 12/2003 Thornbrough ..... F25C 1/04 62/137
6,857,277 B2 * 2/2005 Somura ..... F25C 1/18 249/92
7,665,316 B2 * 2/2010 Ito ..... F25C 1/22 62/353
7,841,203 B2 * 11/2010 Yoon ..... F25C 1/04 249/118
7,934,389 B2 * 5/2011 Yoon ..... F25C 1/10 249/119
9,234,688 B2 * 1/2016 Son ..... F25C 1/04
9,338,081 B2 * 5/2016 Li ..... H04L 45/122
RE49,341 E * 12/2022 Lee ..... F25C 5/08
2004/0099004 A1 * 5/2004 Somura ..... F25C 1/18 62/340
2006/0032249 A1 * 2/2006 Shim ..... F25D 23/126 62/340
2006/0086134 A1 * 4/2006 Voglewede ..... F25C 5/06 62/353
2006/0266915 A1 * 11/2006 Parker ..... A23G 1/205 249/66.1
2007/0164192 A1 * 7/2007 Holden ..... F25C 1/243 249/98
2007/0209381 A1 * 9/2007 Sugaya ..... F25C 5/06 62/340
2007/0283714 A1 * 12/2007 Yoon ..... F25C 1/04 62/340
2009/0178431 A1 * 7/2009 Cho ..... F25C 1/04 62/345
2010/0011786 A1 * 1/2010 Shin ..... F25C 1/04 62/73
2010/0147011 A1 * 6/2010 Kang ..... F25C 5/182 62/347
2010/0205996 A1 * 8/2010 Ducharme ..... F25C 1/10 62/351
2010/0212340 A1 * 8/2010 Kuratani ..... F25C 1/04 62/344
2012/0023996 A1 * 2/2012 Herrera ..... F25C 1/04 249/70
2014/0165599 A1 * 6/2014 Boarman ..... F25C 1/22 62/3.3
2014/0165618 A1 * 6/2014 Culley ..... F25C 1/225 62/71
2014/0165643 A1 * 6/2014 Boarman ..... F25C 1/10 62/340
2014/0167321 A1 * 6/2014 Culley ..... F25C 1/22 264/319

FOREIGN PATENT DOCUMENTS

JP H01158070 10/1989
JP H 02-143068 A * 6/1990
JP H 02-176380 A * 7/1990
JP H05-032978 A * 2/1993
JP 2003-121038 A * 4/2003
JP 2005326035 11/2005
JP 2005326035 A * 11/2005
JP 2008-170086 A * 7/2008
KR 10-2011-0037609 A * 4/2011
KR 20110037609 4/2011

OTHER PUBLICATIONS

Korean Office Action in Korean Patent Appln. No. 10-2020-0080141, dated Oct. 1, 2020, 9 pages (with English translation).
Korean Notice of Allowance in Korean Appln. No. 10-2020-0080141, dated Dec. 8, 2020, 4 pages (with English translation).
Korean Office Action in Korean Appln. No. 10-2020-0080141, dated Oct. 6, 2020, 7 pages (with English translation).
Notice of Allowance in Korean Appln. No. 10-2022-0149841, dated Mar. 1, 2023, 10 pages (with English translation).

* cited by examiner

ICE MAKER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application *is a continuation reissue application of U.S. patent application Ser. No. 16/288,594, filed Feb. 28, 2019, now U.S. Pat. No. RE49,341, which is a reissue application of U.S. application Ser. No. 14/011,811, filed on Aug. 28, 2013, now U.S. Pat. No. 9,581,372, issued on Feb. 28, 2017, which* claims the benefits of priority to Korean Patent Application No. 10-2013-0000082 filed on Jan. 2, 2013, *all of* which [is] *are* herein incorporated by reference in [its] *their* entirety.

FIELD

The present disclosure relates to an ice maker provided inside a refrigerator.

BACKGROUND

In general, refrigerators are home appliances for storing foods at a low temperature in an inner storage space covered by a door. Since such a refrigerator cools the inner storage space by using cool air, foods stored in the storage space may be stored in a refrigerated or frozen state.

Also, an ice maker for making ice may be provided inside a typical refrigerator. The ice maker is configured so that water supplied from a water supply source or a water tank is received into an ice tray to make ice. Also, the ice maker is configured to separate the made ice from the ice tray in a heating or twisting manner.

As described above, the ice maker, in which water is automatically supplied and ice is automatically separated, may have a structure which is opened upward to draw the made ice up. Also, each of the ice pieces made in the ice maker having the above-described structure may have a shape having at least one flat surface such as a crescent moon shape or a cubic shape.

If an ice has a spherical shape, the ice may be more convenient in use and, also, provide unusual feeling to a user. Also, when the made ice pieces are stored, a contact area between the ice pieces may be reduced to reduce the likelihood of the ice pieces being stuck together.

When an ice maker makes spherical ice, the upper portion of a tray should be closed during the ice making process. However, an open structure is required to separate the spherical ice. Thus, an upper tray and a lower tray should be separately provided. A pressing type ice maker in which water is collected in a lower tray and an upper tray is pressed facilitates the supplying of water, but requires a vertical elevation movement of the lower tray to prevent water from leaking to the outside during a pressing process. Also, rotation of the lower tray is required to prevent ice pieces from staying in the lower tray without dropping down from the upper tray to an ice bank during an ice separating process. That is, in the case of the pressing type ice maker, since an operation structure in which the lower tray combines a straight line motion with a rotational motion, the ice maker may be complicated in structure.

SUMMARY

In one aspect, an ice maker includes an upper tray that includes a plurality of upper cells that each have a hemispherical shape and an ice making tube disposed at outer circumferential surfaces of the upper cells and configured to cool each of the upper cells. The ice maker also includes a lower tray that includes a plurality of lower cells that each have a hemispherical shape. The lower tray is rotatably connected to the upper tray. The ice maker further includes a rotation shaft connected to a rear end of the lower tray and a rear end of the upper tray, and configured to rotate the lower tray with respect to the upper tray.

Implementations may include one or more of the following features. For example, the ice maker may include a pair of links each having a first end connected to the lower tray and a second end connected to the upper tray and link guides extending upward from both side ends of the upper tray, respectively. In this example, the ice maker may include an upper ejecting pin assembly connected to the links in a state where both ends thereof are respectively inserted into the link guides. The upper ejecting pin assembly may be configured to ascend or descend together with the links. The upper ejecting pin assembly may include a pin body that has both ends respectively connected to the pair of links and a plurality of ejecting pins extending downward from the pin body.

In addition, the ice maker may include a plurality of lower ejecting pins respectively pressing bottom surfaces of the lower cells when the lower tray is rotated apart from the upper tray to an ice separation position. The ice making tube may include a refrigerant tube in which a low-temperature, low-pressure refrigerant flows, the refrigerant tube being branched from a position between an outlet of an expansion valve and an inlet of an evaporator. The ice maker also may include a switching valve disposed on an inlet-side of the ice making tube.

In some implementations, the ice maker may include an ice separating heater disposed at outer circumferential surfaces of the upper cells and configured to heat the upper cells during an ice separating process. In these implementations, the ice separating heater may be disposed inside or outside the ice making tube and the ice separating heater may extend or be curved along a shape of the ice making tube. Further, in these implementations, the ice separating heater may be disposed on outer circumferential surfaces of the upper cells or the ice separating heater may be disposed adjacent to outer circumferential surfaces of the upper cells.

The ice making tube may be disposed on outer circumferential surfaces of the upper cells or the ice making tube may be disposed adjacent to outer circumferential surfaces of the upper cells. Also, the lower tray may be configured to rotate without a vertical straight line motion in both rotating to attach to the upper tray in making ice, and rotating to separate from the upper tray in separating made ice pieces.

In some examples, the lower tray may be configured to rotate to a water supply position in which the lower tray is spaced apart from the upper tray and receive, at the water supply position, water used in making ice. In these examples, the lower tray may be configured to rotate from the water supply position toward the upper tray to attach to the upper tray based on completion of water supply. In addition, in these examples, the lower tray may be configured to rotate away from the upper tray to an ice separation position based on completion of ice making. The ice separation position may be further from the upper tray than the water supply position.

In another aspect, a refrigerator includes a refrigerating compartment, a freezing compartment, an ice maker configured to make ice pieces, and a dispenser configured to dispense ice pieces made by the ice maker. The ice maker includes an upper tray that includes a plurality of upper cells that each have a hemispherical shape and an ice making tube disposed at outer circumferential surfaces of the upper cells and configured to cool each of the upper cells. The ice maker also includes a lower tray that includes a plurality of lower cells that each have a hemispherical shape. The lower tray is rotatably connected to the upper tray. The ice maker further includes a rotation shaft connected to a rear end of the lower tray and a rear end of the upper tray, and configured to rotate the lower tray with respect to the upper tray.

The details of one or more implementations are set forth in the accompanying drawings and the description below. Other features will be apparent from the description and drawings, and from the claims.

DETAILED DESCRIPTION

Below, a structure of an ice maker and an ice making process using the ice maker is described with reference to the accompanying drawings and flowchart. A pressing type ice maker will be described as an example. In some implementations, the pressing type ice maker may be defined as an ice maker in which water is collected in a lower tray to make ice in a state where the lower tray is closely attached to an upper tray to prevent water from leaking.

Figure 1:
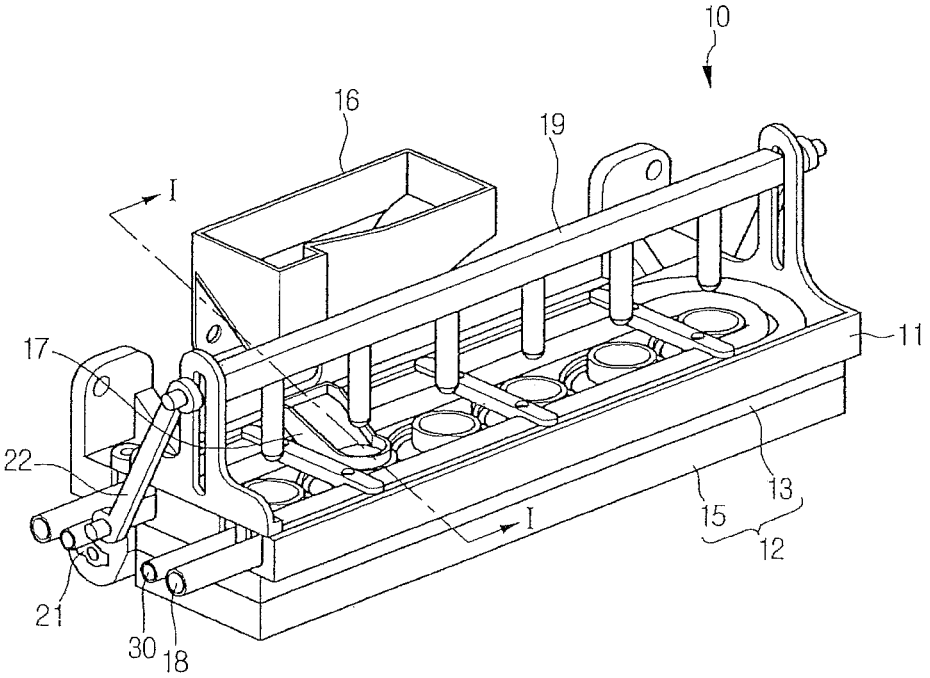
FIG. 1 is a perspective view illustrating an example outer appearance of an example ice maker during an ice making process.
Figure 2:
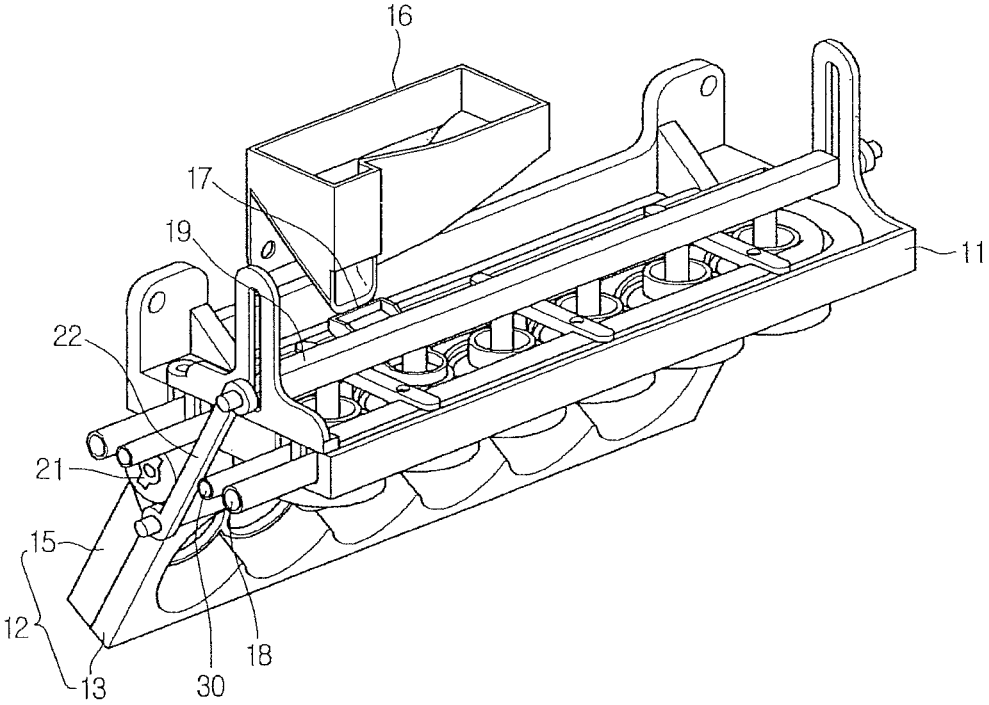
FIG. 2 is a perspective view illustrating an example outer appearance of the example ice maker in a state where ice pieces are completely separated.
Figure 3:
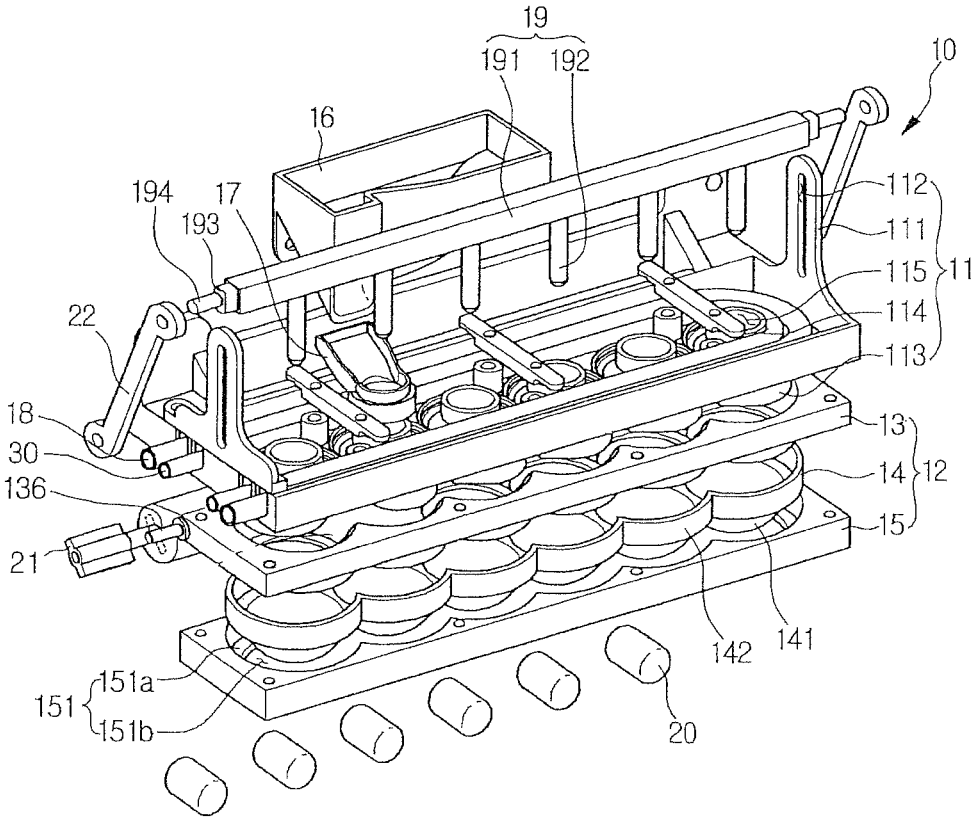
FIG. 3 is an exploded perspective view of the example ice maker.

FIG. 1 illustrates an example outer appearance of an example ice maker during an ice making process, FIG. 2 illustrates an example outer appearance of the example ice maker in a state where ice pieces are completely separated, and FIG. 3 illustrates an exploded perspective view of the example ice maker.

Referring to FIGS. 1 to 3, an ice maker 10 includes an upper tray 11 that makes ice corresponding to an upper hemispheric portion with respect to a horizontal surface bisecting a spherical ice piece, a lower tray 12 that makes ice corresponding to a lower hemispheric portion, a water supply tray 16 disposed above the upper tray 11 to supply water for making ice, a water supply guide 17 guiding the water supplied from the water supply tray 16 into the lower tray 12, an ice separating heater 18 placed on a top surface of the upper tray 11 to heat the upper tray 11, thereby separating made ice, an ice making tube 30 disposed inside and outside the ice separating heater 18, an upper ejecting pin assembly 19 separating ice pieces that are closely attached to upper cells 113 of the upper tray 11, a rotation shaft 21 rotatably connecting the lower tray 12 to the upper tray 11, a link 22 having an end connected to the upper ejecting pin assembly 19 and the other end connected to the lower tray 12, and a lower ejecting pin 20 separating ice pieces attached to the lower tray 12.

In some implementations, the lower tray 12 has a rear end rotatably coupled to a rear end of the upper tray 11 by the rotation shaft 21. A link connecting end 136 protrudes from a portion of the lower tray 12 directly adjacent to the rotation shaft 21. The link 22 has the other end connected to the link connecting end 136 to elevate the upper ejecting pin assembly 19 during the rotation of the lower tray 12.

The lower tray 12 includes a tray body 14 including a plurality of lower cells 141, a lower frame 15 including a tray body seating part 151 on which the tray body 14 is seated, and an upper frame 13 having a bottom surface to which the tray body 14 and the lower frame 15 are fixed.

The tray body seating part 151 disposed inside the lower frame 15 includes a plurality of holes 151a through which the lower cells 141 of the tray body 14 pass, and a hook part 151b disposed at an edge of each of the holes to hook the tray body 14.

The plurality of the lower cells 141 each have a hemispherical shape and are arranged in the tray body 14. An extension end 143 (see FIG. 7) extends radially from an edge of a top surface of each of the lower cells 141, and a guide wall 142 extends by a predetermined height from an end of the extension end 143. The extension end 143 and the guide wall 142 are seated on the tray body seating part 151 of the lower frame 15 to prevent the tray body 14 from being separated from the lower frame 15. The plurality of lower ejecting pins 20 involve a number corresponding to that of the lower cells 141 and horizontally protrude under the lower tray 12. The lower cells 141 pass through the lower frame 15 and are exposed to the outside. Thus, when the lower tray 12 is rotated downward to separate ice, the bottom surfaces of the lower cells 141 are respectively pressed by the lower ejecting pins 20. The lower cells 141 may include a soft plastic member tending to return to its original state after deformation. Thus, the lower ejecting pin 20 presses a bottom surface of the lower cell 141 to separate spherical ice pieces attached to the lower cells 141.

The rotation shaft 21 passes through a rear end of the upper frame 13, particularly, both edges of the rear end. A link connecting end 136 protrudes from each of both side surfaces of the rear end of the upper frame 13.

The upper cells 113 each have a hemispherical shape and are arranged in the upper tray 11. The plurality of upper cells 113 are closely attached to the lower cells 141 of the tray body 14 to define spherical spaces, respectively.

Guide sleeves 114 protrude from top surfaces of the upper cells 113 to define air holes 115, respectively. The water supply guide 17 has an end inserted into an outer circumferential surface of one of the plurality of guide sleeves 114. For instance, a sleeve having the same outer diameter as that of each of the guide sleeves 114 is disposed on an outlet-side end of the water supply guide 17 to supply water supplied from the water supply tray 16 to the lower cells 141 without leaking.

A link guide 111 extends by a predetermined length upward from each of left and right edges of the upper tray 11. A guide hole 112 vertically extends with a predetermined width inside the link guides 111.

The ice making tube 30 and the ice separating heater 18 are placed on the top surface of the upper tray 11. When the water is completely supplied, and the lower tray 12 is closely attached to the upper tray 11, a low-temperature refrigerant flows into the ice making tube 30. The ice making tube 30 may be branched from a certain position between an outlet of an expansion valve and an inlet of an evaporator, and a switching valve may be disposed on an inlet-side of the ice making tube 30. Thus, when ice making is performed, the switching valve is opened, and a portion of the refrigerant discharged from the expansion valve flows into the ice making tube 30. The upper tray 11 contacting the ice making tube 30 is cooled, and thus the water stored in the cells is frozen. To make ice, the refrigerant flowing into the ice making tube 30 and cool air supplied from the evaporator may be supplied together into the ice maker 10.

Also, when ice is completely made, the ice separating process is performed. When the ice separating process is performed, the ice separating heater 18 is operated. The ice separating heater 18 heats surfaces of the upper cells 113 by using heat generated therefrom. As a result, ice pieces attached to the upper cells 113 are slightly melted and thus are separated.

The upper ejecting pin assembly 19 includes a plurality of upper ejecting pins 192 and a pin body 191 to which the upper ejecting pins 192 are attached. A guide protrusion 193 protrudes from each of both ends of the pin body 191, and a link connecting end 194 protrudes from the guide protrusion 193. The guide protrusion 193 is inserted in the guide hole 112 of the link guide 111 to ascend or descend along the guide hole 112. The link 22 has one end connected to the link connecting end 194. The plurality of upper ejecting pins 192 are disposed on positions to pass through the air holes 115 disposed in the top surfaces of the upper cells 113, respectively. Thus, when the plurality of upper ejecting pins 192 descends, the upper ejecting pins 192 pass through the air holes 115 to push ice pieces attached to the upper cells 113 out.

Figure 4:
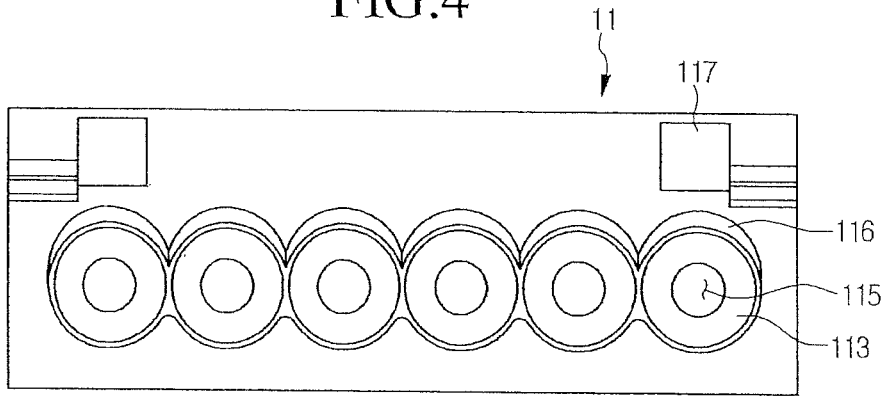
FIG. 4 is a bottom view of an example upper tray included in the example ice maker.

FIG. 4 illustrates an example upper tray included in the example ice maker.

Referring to FIG. 4, the plurality of upper cells 113 are disposed adjacent to each other in the upper tray 11. In some examples, each of the upper cells 113 is rounded in a convex hemispherical shape.

The air holes 115 are defined in the top surfaces of the upper cells 113, respectively. A rotation guide part 116 is curved at a predetermined curvature on a rear portion of the edge of each of the upper cells 113. For instance, the rotation guide part 116 is curved at a predetermined curvature on an outer circumferential surface of the rear portion of each of the upper cells 113. Shaft connecting parts 117 are disposed at the rear left and right ends of the upper tray 11, respectively. Both ends of the rotation shaft 21 respectively pass through and are inserted into the shaft connecting parts 117 so that the lower tray 12 is rotatably connected thereto. Each of the shaft connection parts 135 (see FIG. 5) is disposed at a portion spaced apart from each of both sides of the upper tray 11. The shaft connection part 135 disposed on a corner of a rear end of the upper fame 13 may be disposed in the space. Thus, both ends of the rotation shaft 21 sequentially pass through and are inserted into the shaft connecting parts 117 of the upper tray 11 and the shaft connecting parts 135 of the upper frame 13.

A function of the rotation guide part 116 is described below with reference to the accompanying drawings.

Figure 5:
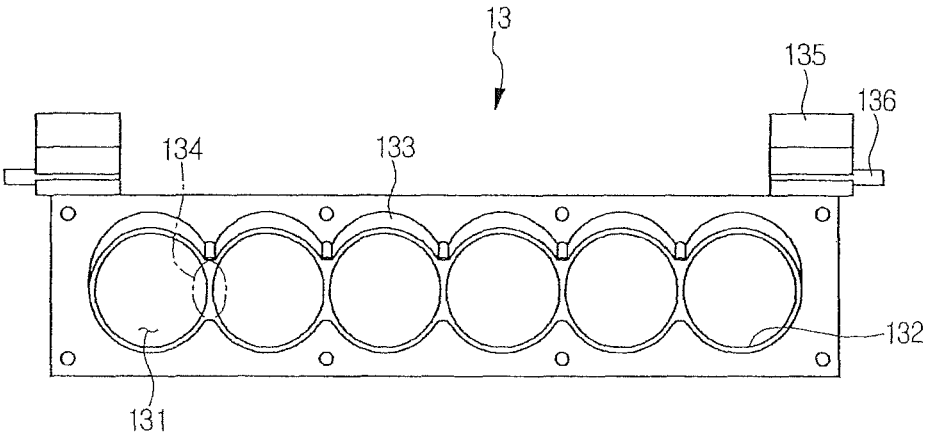
FIG. 5 is a plan view of an example upper frame included in the example ice maker.

FIG. 5 illustrates an example upper frame included in the example ice maker.

Referring to FIG. 5, the upper frame 13 is part of the lower tray 12 and is seated on a top surface of the tray body 14. The tray body 14 and the lower frame 15 are fixed to the bottom surface of the upper frame 13.

In some implementations, the shaft connecting part 135 protrudes from each of both corners of a rear end of the upper frame 13, and the link connecting end 136 protrudes from an outer surface of the shaft connecting part 135.

Communication holes 131 each having the same diameter as the top surface of each of the lower cells 141 of the tray body 14 are arranged within the upper frame 13. For instance, each of the communication holes 131 is defined in the top surface of each of the lower cells 141, and the bottom surface of the upper cell 113 of the upper tray 11 is placed on the top surface of the communication hole 131. A hook part 132 is disposed on an edge of the communication hole 131. When a water level reaches a height of the hook part 132, the lower tray 12 is rotated to closely attach the lower tray 12 to the upper tray 11.

Unlike a front edge of the communication hole 131, a rotation guide part 133 curved with a predetermined curvature is disposed on a rear edge of the communication hole 131. In this regard, the hook part 132 horizontally and vertically extends from the edge of the communication hole 131 in a front region of the communication hole 131, whereas the rotation guide part 133 horizontally extends from the edge of the communication hole 131, and then is curved upward at a predetermined curvature. The curvature of the rotation guide part 133 is the same as that of the rotation guide part 116 of the upper tray 11. When the lower tray 12 is rotated, the rotation guide part 133 of the upper frame 13 is rotated in contact with the rotation guide part 116 of the upper tray 11.

A water runner 134 defined by cut-off portions of the hook part 132 and the rotation guide part 133 is defined between the communication holes 131. As shown in FIG. 5, the water runner 134 is defined by the hook part 132 and the rotation guide part 133, which are not recessed and face each other so that the water runner is defined in a surface of the upper frame 13 corresponding to a region between the communication holes 131 adjacent to each other. This is possible because of the pressing type ice maker 10 in which the lower tray 12 and the upper tray 11 are closely attached to each other in the state where the water is completely supplied. The water runner 134 is sufficiently large in width and height. Thus, even though water is rapidly supplied, an overflow of the water out of the tray is prevented.

For example, in a case of a reservoir type ice maker in which water is supplied in a state where an upper tray and a lower tray are closely attached to each other to define a complete sphere, the water runner 134 should have a shape recessed in the upper tray and/or the lower tray so that water is transferred from the cell corresponding to a water supply position to the adjacent cells. When the water runner is significantly small in width and depth, a flow rate of water transferred into the adjacent cells may be significantly lower than a water supply rate to cause the overflow of water. On the contrary, when the water runner is significantly large in width and depth, it may be difficult to form a completely spherical ice piece and adjacent ice pieces may be stuck to each other.

Figure 6:
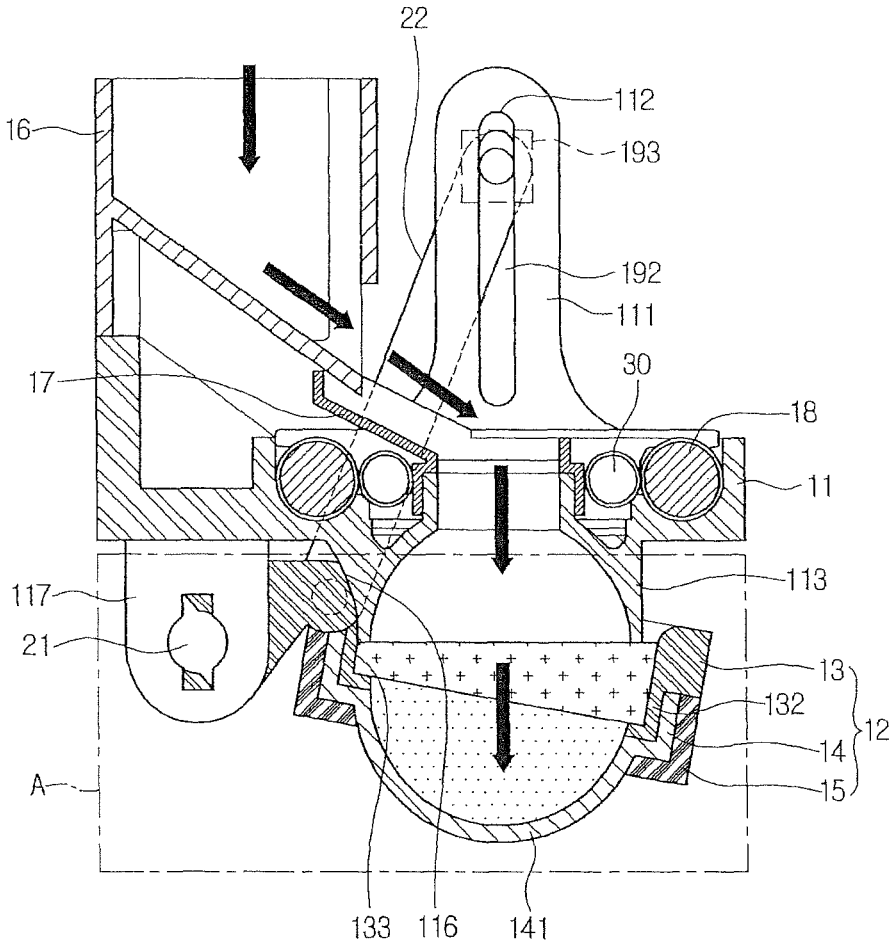
FIG. 6 is a side cross-sectional view of the example ice maker, taken along line I-I of FIG. 1, in a water supply state.
Figure 7:
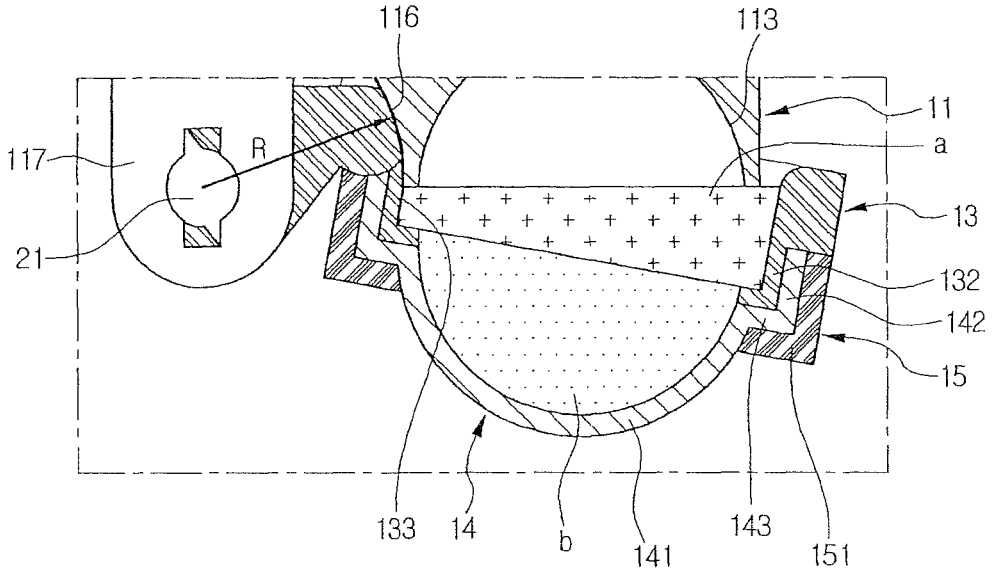
FIG. 7 is an enlarged view of a portion A of FIG. 6.
Figure 8:
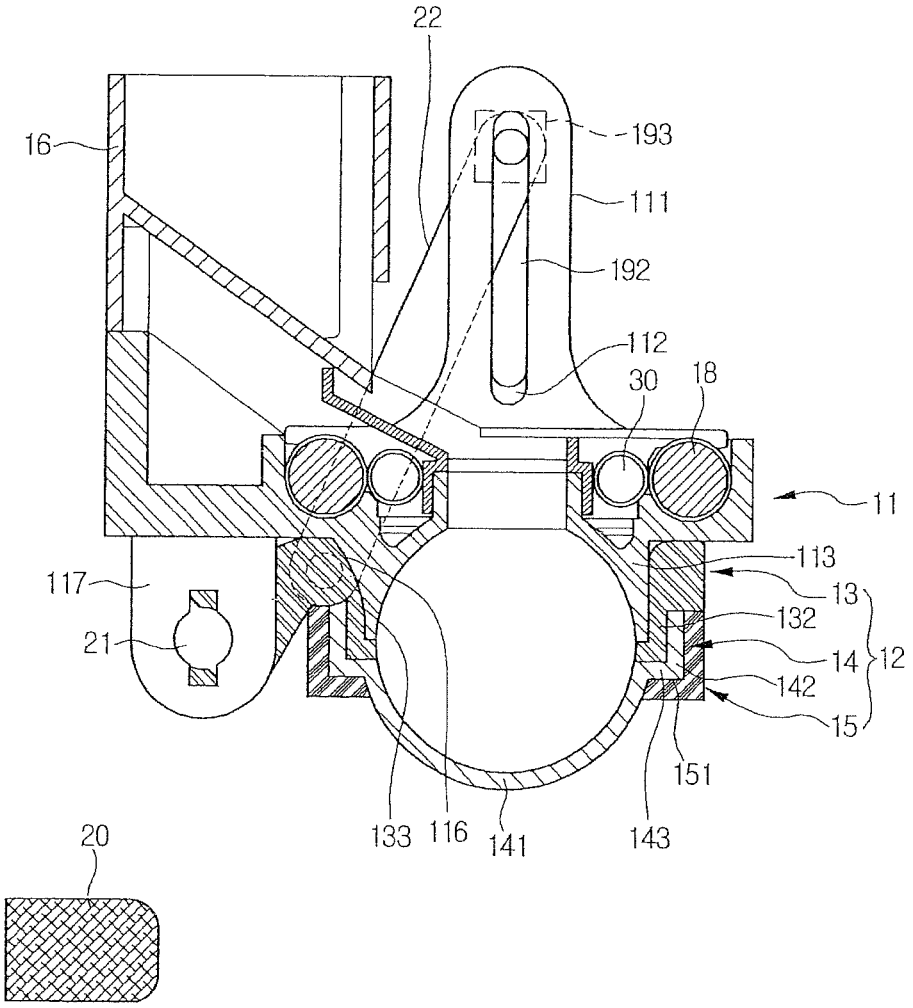
FIG. 8 is a side cross-sectional view of the example ice maker, taken along line I-I of FIG. 1 in an ice making state.
Figure 9:
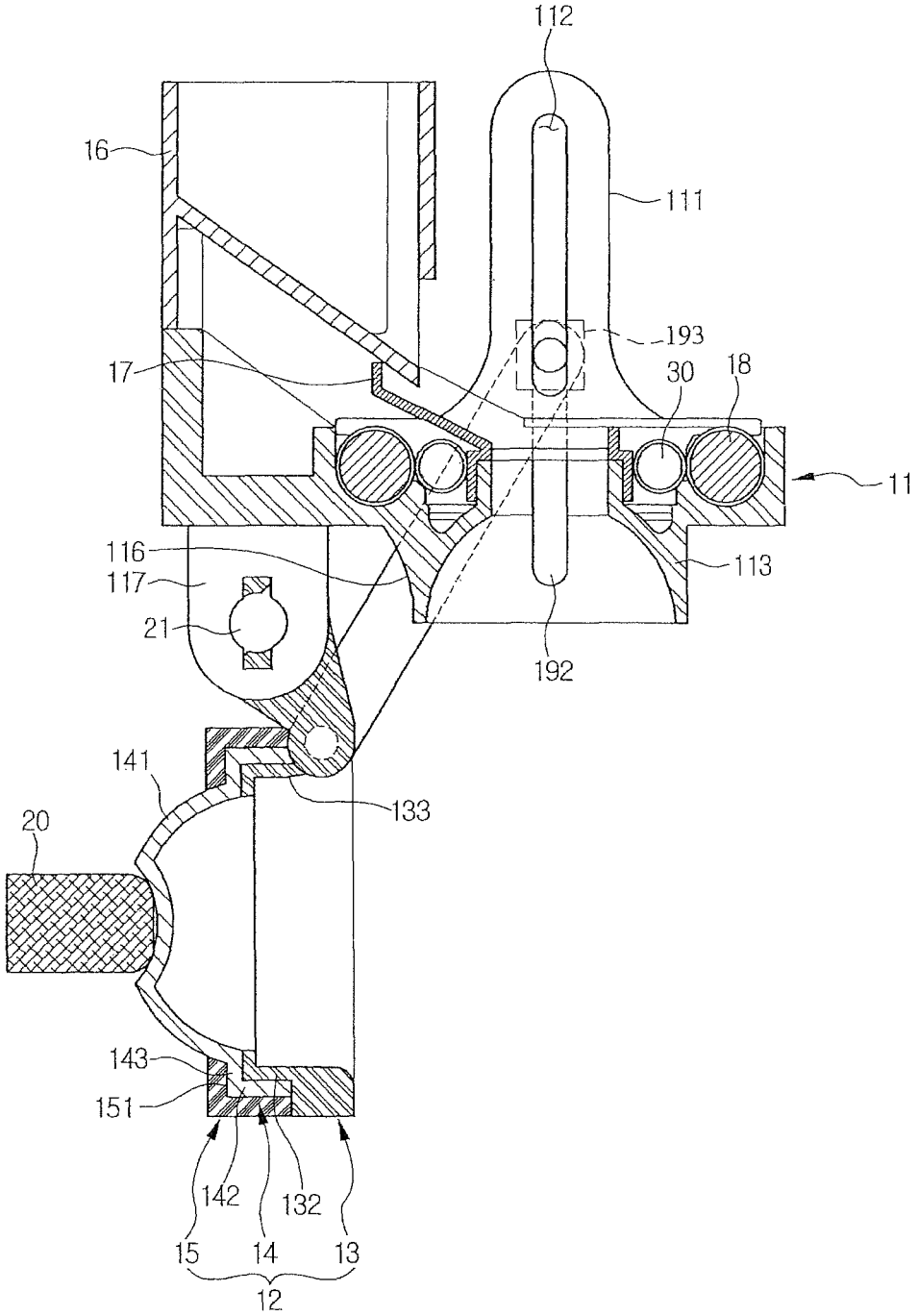
FIG. 9 is a side cross-sectional view of the example ice maker, taken along line I-I of FIG. 1 in a state where ice pieces are completely separated.

FIGS. 6 to 9 illustrate an example operation process of an example ice maker from a water supply process to an ice separating process. FIG. 6 is a cross-sectional view taken along line I-I of FIG. 1 in a water supply state, FIG. 7 is an enlarged view of a portion A of FIG. 6, FIG. 8 is a side cross-sectional view of the ice maker taken along line I-I of FIG. 1 in an ice making state, and FIG. 9 is a side cross-sectional view of the ice maker taken along line I-I of FIG. 1 in a state where ice pieces are completely separated. Referring to FIGS. 6 and 7, the lower tray 12 is rotated downward at a predetermined angle from a horizontal state just before water is supplied. That is, when the lower tray 12 is separated downward from the upper tray 11, water is supplied.

As described above, the ice maker 10 is a pressing type ice maker in which water for making ice is filled in the lower tray, and then the lower tray 12 is closely attached to the upper tray 11 to make ice.

Thus, water is supplied in a state where the lower tray 12 is slightly inclined and spaced apart from the upper tray 11. Referring to FIG. 7, water is supplied until a water level reaches a point of an upper end of the hook part 132 of the upper frame 13. A volume of water filled into a region b is substantially the same as that of the lower cell 141, and a volume of water filled into a region a is slightly smaller than or substantially the same as that of the upper cell 113. When the region a is filled with water, the supply of water is stopped, and the rotation shaft 21 is further rotated in a counterclockwise direction in FIG. 7 to closely attach the lower tray 12 to the upper tray 11.

At this point, the rotation guide part 133 disposed in the rear portion of the upper frame 13 is rotated along the rotation guide part 116 in a state where the rotation guide part 133 is closely attached to the rotation guide part 116 disposed in the rear portion of the upper tray 11. The rotation guide part 133 and the rotation guide part 116 may have the same curvature radius R.

As such, since an interfering portion between the lower tray 12 and the upper tray 11 when the lower tray 12 is rotated in the state where the lower tray 12 is connected to the upper tray 11 is curved at a predetermined curvature, it may be unnecessary to perform a straight line motion when the lower tray 12 is closely attached to or separated from the upper tray 11. In this regard, even though the lower tray 12 is closely attached to the upper tray 11 only through the rotational motion thereof, water supplied into the lower tray 12 does not overflow out of the lower tray 12.

Referring FIG. 8, when the lower tray 12 is rotated and closely attached to the upper tray 11, the upper cell 113 of the upper tray 11 is closely attached to the hook part 132 of the upper frame 13. That is, water stored in the lower tray 12 leaks out of the spherical cell. Also, the water filled into the region a of FIG. 7 is filled into the upper cell 113 of the upper tray 11 according to the rotation of the lower tray 12. In addition, since the lower end of the upper cell 113 is closely attached to the communication hole 131 of the upper frame 13, the phenomenon in which ice pieces made in the adjacent cells are stuck to each other may be reduced (e.g., prevented).

In some examples, the rotation shaft 21 is rotated in a counterclockwise direction to closely attach the lower tray 12 to the upper tray 11, and simultaneously, the link connecting end 136 is rotated together to ascend. Also, the other end of the link 22 connected to the link connecting end 136 ascends, and thus, the upper ejecting pin assembly 19 connected to one end of the link 22 ascends. Also, the upper ejecting pin 192 is out of the upper cells 113 of the upper tray 11 while ascending.

Referring to FIG. 9, when ice pieces are completely made, and the ice separating process is performed, the ice separating heater 18 is operated to melt a surface of the ice frozen within the spherical cell and attached to a surface of the upper cell 113. As a result, the ice is separated from the upper cell 113. Thereafter, the rotation shaft 21 is rotated to rotate the lower tray 12 in a clockwise direction. As a result, the ice is rotated together with the lower cells 141 in a state where the ice is attached to the lower tray 12.

As the rotation of the lower tray 12, the link 22 descends, and the upper ejecting pin 192 protruding from the upper ejecting pin assembly 19 is inserted into the upper cell 113 through the air hole 115 of the upper cell 113. This is done for separating an ice piece that is attached to the upper cell 113, but is not separated from the upper cell 113.

When the lower tray 12 is rotated up to a substantially vertical state, the lower ejecting pin 20 presses the bottom surface of the lower cell 141 to separate the ice from the lower cell 141. When the ice is completely separated, the lower tray 12 is reversely rotated again and then stopped in the state of FIG. 6. In addition, the bottom surface of the lower cell 141 returns to the hemispherical shapes by self-elastic force thereof.

Figure 10:
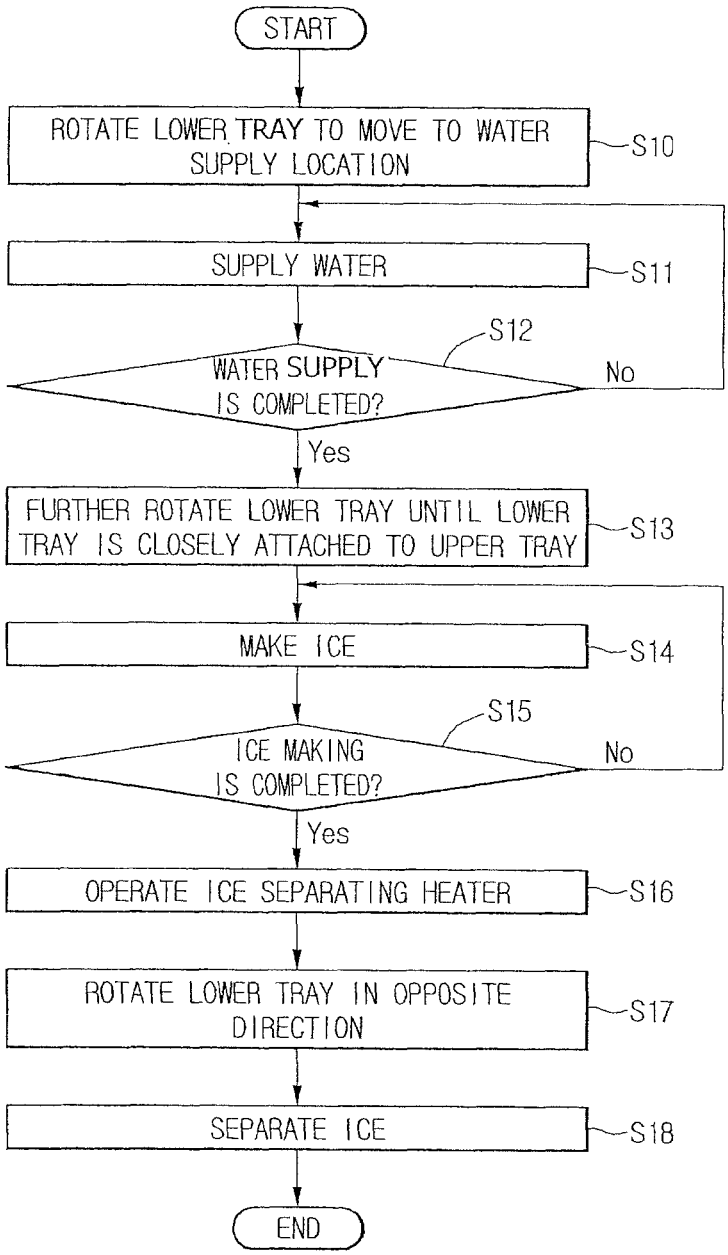
FIG. 10 is a flowchart illustrating an example ice making process of the example ice maker.

FIG. 10 illustrates an example ice making process of an example ice maker.

The water supply process, the ice making process, and the ice separating process, which are described with reference to FIGS. 6 to 9, will now be described with respect to FIG. 10.

Referring to FIG. 10, in operation S10, the lower tray 12 is forwardly rotated to move to a water supply position (see FIG. 6). In this state, water is supplied in operation S11. When it is determined that water is completely supplied in operation S12, the lower tray 12 is rotated until the lower tray is closely attached to the upper tray 11 in operation S13. In this state, the ice making process is performed in operation S14. During the ice making process, a surface of the cell of the upper tray 11 is cooled and frozen by refrigerant flowing into the ice making tube 30.

Also, if it is determined that the ice is completely made in operation S15, the ice separating heater 18 is operated in operation S16 to separate the ice generated in the cell from the surface of the upper cell 113. Then, the operation of the ice separating heater 18 is stopped, and the lower tray 12 is reversely rotated to move up to an ice separating position in operation S17. While the lower tray 12 moves to the ice separating position, the lower ejecting pin 20 presses the bottom surface of the lower portion of the lower tray 12 to separate the ice in operation S18.

As described above, although the ice maker is provided as a pressing type ice maker, the lower tray just rotates without a vertical straight line motion in both the process in which the lower tray is closely attached to the upper tray for making ice after water is completely supplied, and the process in which the lower tray is separated from the upper tray for separating made ice pieces. Since the vertical straight line motion of the lower tray is unnecessary, the operation mechanism of the ice maker may be simplified in design.

Although implementations have been described with reference to a number of illustrative examples thereof, it should be understood that numerous other modifications and examples can be devised by those skilled in the art that will fall within the spirit and scope of the principles of this disclosure. More particularly, various variations and modifications are possible in the component parts and/or arrangements. In addition to variations and modifications in the component parts and/or arrangements, alternative uses will also be apparent to those skilled in the art.

What is claimed is:

[1. An ice maker comprising: an upper tray that includes a plurality of upper cells that each have a hemispherical shape, each of the plurality of upper cells shaped to be upwardly convex; an ice making tube disposed at outer circumferential surfaces of the upper cells and configured to cool each of the upper cells;

a lower tray that is rotatably connected to the upper tray, the lower tray comprising:

a tray body in which a plurality of lower cells are formed, each of the plurality of lower cells being configured to have a hemispherical shape and being configured to be downwardly convex; and an upper frame comprising:

a plurality of communication holes each with a same diameter as a top surface of each of the lower cells; and a hook part that is configured to extend horizontally and vertically from an edge of the communication holes, where an upper end of the hook part is configured to be higher than the top surface of the lower cells;

a rotation shaft connecting a rear end of the lower tray and a rear end of the upper tray, and configured to rotate the lower tray with respect to the upper tray, wherein the lower tray is configured to be placed at a water supply position by rotating in a first direction, and opened surfaces of the plurality of upper cells and opened surfaces of the plurality of lower cells are configured to be spaced apart from and face each other at the water supply position, wherein the plurality of lower cells of the lower tray receive water for making ice at the water supply position, wherein, when the water level reaches the upper end of the hook part the lower tray is configured to further rotate in the first direction to an ice making position where the opened surfaces of the plurality of lower cells are in closed contact with the opened surfaces of the plurality of upper cells of the upper tray, to define a complete sphere shape, and wherein, when the lower tray rotates, the upper tray is maintained to be stationary.]

[2. The ice maker according to claim 1, further comprising:

a pair of links each having a first end connected to the lower tray and a second end connected to the upper tray;

link guides extending upward from both side ends of the upper tray, respectively; and an upper ejecting pin assembly connected to the links in a state where both ends thereof are respectively inserted into the link guides, the upper ejecting pin assembly being configured to ascend or descend together with the links.]

[3. The ice maker according to claim 2, wherein the upper ejecting pin assembly comprises:

a pin body that has both ends respectively connected to the pair of links; and a plurality of ejecting pins extending downward from the pin body.]

[4. The ice maker according to claim 1, further comprising a plurality of lower ejecting pins respectively pressing bottom surfaces of the lower cells when the lower tray is rotated apart from the upper tray to an ice separation position.]

[5. The ice maker according to claim 1, wherein the ice making tube comprises a refrigerant tube in which a low-temperature, low-pressure refrigerant flows, the refrigerant tube being branched from a position between an outlet of an expansion valve and an inlet of an evaporator.]

[6. The ice maker according to claim 5, further comprising a switching valve disposed on an inlet-side of the ice making tube.]

[7. The ice maker according to claim 1, further comprising an ice separating heater disposed at outer circumferential surfaces of the upper cells and configured to heat the upper cells during an ice separating process.]

[8. The ice maker according to claim 7, wherein the ice separating heater is disposed inside or outside the ice making tube.]

[9. The ice maker according to claim 8, wherein the ice separating heater is disposed inside the ice making tube.]

[10. The ice maker according to claim 8, wherein the ice separating heater is disposed outside the ice making tube.]

[11. The ice maker according to claim 8, wherein the ice separating heater extends or is curved along a shape of the ice making tube.]

[12. The ice maker according to claim 11, wherein the ice separating heater extends along a shape of the ice making tube.]

[13. The ice maker according to claim 11, wherein the ice separating heater is curved along a shape of the ice making tube.]

[14. The ice maker according to claim 7, wherein the ice separating heater is disposed adjacent to outer circumferential surfaces of the upper cells.]

[15. The ice maker according to claim 1, wherein the ice making tube is disposed on outer circumferential surfaces of the upper cells.]

[16. The ice maker according to claim 1, wherein the ice making tube is disposed adjacent to outer circumferential surfaces of the upper cells.]

[17. The ice maker according to claim 1, wherein the lower tray is configured to rotate without a vertical straight line motion in both rotating to attach to the upper tray in making ice, and rotating to separate from the upper tray in separating made ice pieces.]

[18. The ice maker according to claim 1, wherein the lower tray is configured to rotate in a second direction, which is opposite of the first direction, to an ice separation position, when the ice making is completed, and the opened surfaces of the plurality of lower cells of the lower tray are separated from the opened surfaces of the plurality of upper cells of the upper tray, wherein, at the ice separation position, the lower tray is farther away from the upper tray than at the water supply position.]

*19. An ice maker comprising:*

*a first stationary tray including a plurality of first cells in a convex shape to form a first portion of an ice; and*

*a second moving tray that is operably coupled to the first tray and configured to be opened and closed with respect to the first tray, the second tray including a plurality of second cells in a convex shape to form a second portion of the ice,*

*wherein the second tray comprises:*

*a first frame having a plurality of communication openings each with a substantially same diameter as an open surface of each of the second cells,*

*a hook part that is configured to extend horizontally and vertically from an edge of the communication*

*openings, wherein the plurality of second cells pass through the first frame, and*

*a second frame that is configured to be fixed to a surface of the first frame.*

*20. The ice maker of claim 19, further comprising an upper ejecting pin assembly configured to separate ice pieces from the first tray.*

*21. The ice maker of claim 20, wherein the upper ejecting pin assembly is movably connected to the second tray and configured to ascend or descend based on a rotation of the second tray.*

*22. The ice maker of claim 21, wherein the upper ejecting pin assembly comprises:*

*a pin body that extends in a horizontal direction and is connected to the second tray; and*

*a plurality of upper ejecting pins that extend downward in a vertical direction from a lower side of the pin body.*

*23. The ice maker of claim 22, further comprising a link that links the upper ejecting pin assembly to the second tray and that has a first end connected to the pin body of the upper ejecting pin assembly and a second end connected to the second tray,*

*wherein the upper ejecting pin assembly is connected to the link and configured to ascend or descend together with the link based on the rotation of the second tray.*

*24. The ice maker of claim 23, wherein the upper ejecting pin assembly further includes a link connecting end protruding from the pin body and connected to the first end of the link.*

*25. The ice maker of claim 23, further comprising:*

*a link guide extending upward from the first tray; and*

*a guide hole defined in the link guide and extending vertically,*

*wherein in a state where an end of the pin body is inserted into the guide hole, the upper ejecting pin assembly is configured to ascend or descend with the link along the guide hole.*

*26. The ice maker of claim 25, wherein the upper ejecting pin assembly further includes:*

*a guide protrusion protruding from the pin body and configured to be inserted into the guide hole; and*

*a link connecting end protruding from the guide protrusion and connected to the first end of the link.*

*27. The ice maker of claim 23, wherein the second tray comprises:*

*a rear end rotatably coupled to a rear end of the first tray by a rotation shaft; and*

*a link connecting end protruding from the second tray and connected to the second end of the link.*

*28. The ice maker of claim 27, wherein the rotation shaft is configured to pass through both edges of a rear end of the first frame, and*

*wherein the link connecting end protrudes from each of both side surfaces of the rear end of the first frame.*

*29. The ice maker of claim 23, wherein, when the second tray rotates downward with respect to the first tray, the second end of the link is configured to descend and the upper ejecting pin assembly is configured to descend together with the link.*

*30. The ice maker of claim 22, wherein the first tray defines a plurality of holes disposed at open surfaces of the first cells, respectively,*

*wherein the plurality of upper ejecting pins are configured to be disposed outside the first tray during an ice making process, and*

*wherein the plurality of upper ejecting pins are configured to pass through the holes during an ice separating process.*

*31. The ice maker of claim 19, further comprising a plurality of lower ejecting pins that are configured to respectively press on closed surfaces of the second cells when the second tray is rotated apart from the first tray during an ice separating process.*

*32. An ice maker comprising:*

*an upper tray that includes a plurality of upper cells in a convex shape to form a first portion of an ice; and*

*a lower tray that is operably coupled to the upper tray and configured to be opened and closed with respect to the upper tray, the lower tray including a plurality of lower cells in a convex shape to form a second portion of the ice,*

*wherein the lower tray comprises:*

*an upper frame having a plurality of communication openings each with a substantially same diameter as an open surface of each of the lower cells,*

*a hook part that is configured to extend horizontally and vertically from an edge of the communication openings, wherein the plurality of lower cells pass through the upper frame, and*

*a lower frame that is configured to be fixed to a bottom surface of the upper frame.*

*33. The ice maker of claim 32, wherein the lower tray further comprises a guide wall extending upward from an extension end that extends radially from an edge of a top surface of each of the plurality of lower cells, and*

*wherein the hook part is seated on the extension end and the guide wall.*

* * * * *